(12) United States Patent
Wagner

(10) Patent No.: US 10,834,870 B2
(45) Date of Patent: Nov. 17, 2020

(54) LAWN CARE VEHICLE BRAKE SYSTEM

(71) Applicant: Husqvarna AB, Huskvarna (SE)

(72) Inventor: Mark Wagner, Harrisburg, NC (US)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 16/616,092

(22) PCT Filed: Oct. 26, 2018

(86) PCT No.: PCT/IB2018/058390
§ 371 (c)(1),
(2) Date: Nov. 22, 2019

(87) PCT Pub. No.: WO2019/082149
PCT Pub. Date: May 2, 2019

(65) Prior Publication Data
US 2020/0146214 A1 May 14, 2020

Related U.S. Application Data

(60) Provisional application No. 62/577,195, filed on Oct. 26, 2017.

(51) Int. Cl.
*A01D 69/10* (2006.01)
*A01D 34/64* (2006.01)
(Continued)

(52) U.S. Cl.
CPC ............ *A01D 34/64* (2013.01); *A01D 34/82* (2013.01); *B60T 7/10* (2013.01); *B62D 11/08* (2013.01);
(Continued)

(58) Field of Classification Search
CPC ........ A01D 34/64; A01D 34/82; A01D 69/10; B60T 7/10; B60T 11/20; B62D 11/08; B62D 11/006
See application file for complete search history.

(56) References Cited

U.S. PATENT DOCUMENTS 6,434,917 B1 * 8/2002 Bartel ................... A01D 34/64
180/286
6,708,805 B2 * 3/2004 Samejima ................ B60T 7/02
180/6.34

(Continued)

FOREIGN PATENT DOCUMENTS

CN 106114477 A 11/2016
WO 2014149737 A1 9/2014
WO 2015169381 A1 11/2015

OTHER PUBLICATIONS

International Search Report and Written Opinion of international application No. PCT/162018/058390 dated Feb. 25, 2019, all enclosed pages cited.

*Primary Examiner* — Ruth Ilan
*Assistant Examiner* — Michael R Stabley
(74) *Attorney, Agent, or Firm* — Burr & Forman, LLP

(57) ABSTRACT

A riding lawn care vehicle includes a frame to which at least a first and second drive wheels are attachable. The vehicle further includes a brake assembly operably coupled to the first and second drive wheels to enable brakes to be selectively applied to the first and second drive wheels. The riding lawn care vehicle also includes a steering assembly with first and second steering levers. First and second steering levers are operably coupled to first and second drive wheels respectively to facilitate turning of the riding lawn care vehicle based on drive speed control of the first and second drive wheels responsive to positioning of first and second steering levers. First and second steering levers are also operably coupled to the brake assembly to activate the brake assembly in response to one of the first or second steering levers being rotated about a vertical axis of the respective lever.

19 Claims, 13 Drawing Sheets

(51) Int. Cl.
  *A01D 34/82*  (2006.01)
  *B60T 7/10*  (2006.01)
  *B62D 11/08*  (2006.01)
  *A01D 101/00*  (2006.01)
  *B60T 11/20*  (2006.01)
  *B62D 11/00*  (2006.01)

(52) U.S. Cl.
  CPC .......... *A01D 69/10* (2013.01); *A01D 2101/00* (2013.01); *B60T 11/20* (2013.01); *B62D 11/006* (2013.01)

(56) References Cited

U.S. PATENT DOCUMENTS

| | | | |
|---|---|---|---|
| 6,729,115 B2 * | 5/2004 | Bartel | A01D 34/69 |
| | | | 180/286 |
| 7,051,499 B2 * | 5/2006 | Goto | A01D 34/74 |
| | | | 56/14.9 |
| 7,677,371 B2 * | 3/2010 | Dong | F16D 49/16 |
| | | | 188/350 |
| 9,173,346 B2 * | 11/2015 | Koike | A01D 69/02 |
| 2002/0026779 A1 | 3/2002 | Velke et al. | |
| 2006/0174601 A1 * | 8/2006 | Piontek | A01D 34/64 |
| | | | 56/11.3 |
| 2006/0175098 A1 * | 8/2006 | Sutherland | B62D 1/02 |
| | | | 180/6.24 |
| 2008/0034722 A1 * | 2/2008 | Wright | A01D 69/00 |
| | | | 56/14.7 |
| 2014/0110182 A1 * | 4/2014 | Dwyer | A01D 34/824 |
| | | | 180/6.2 |

* cited by examiner

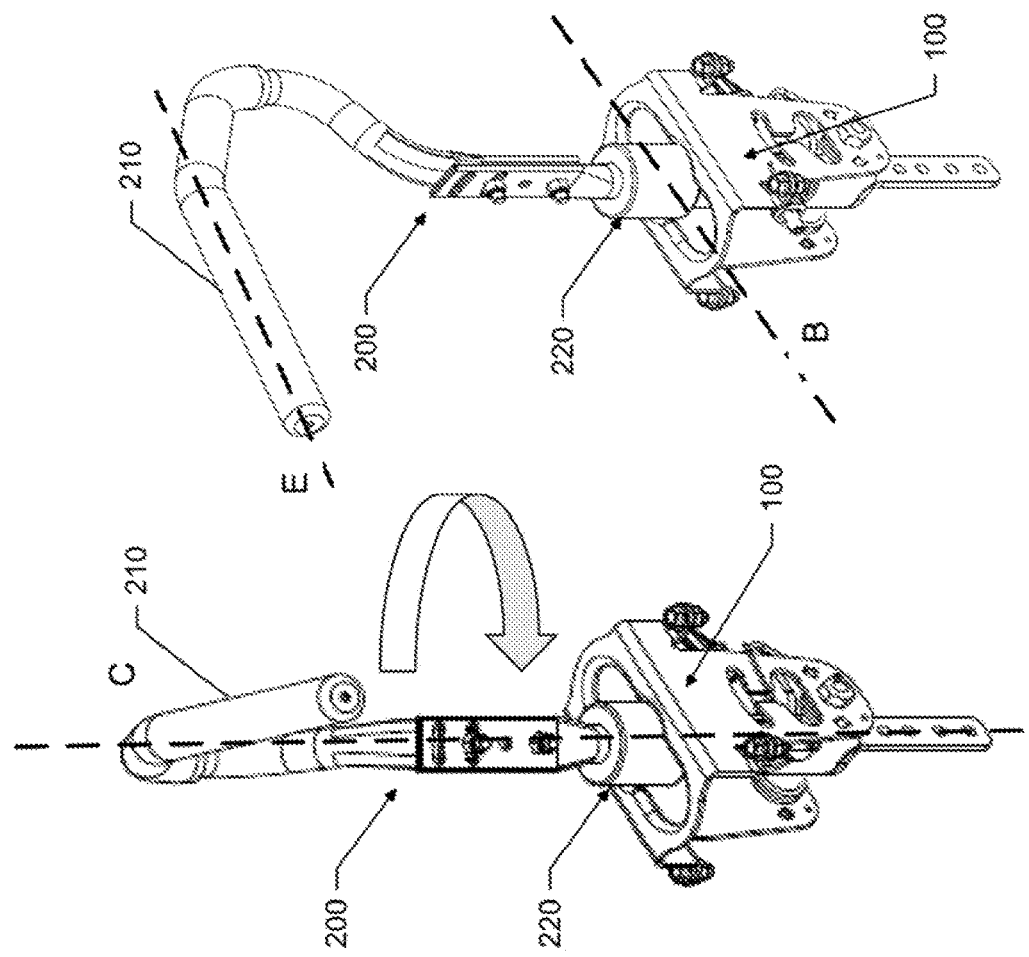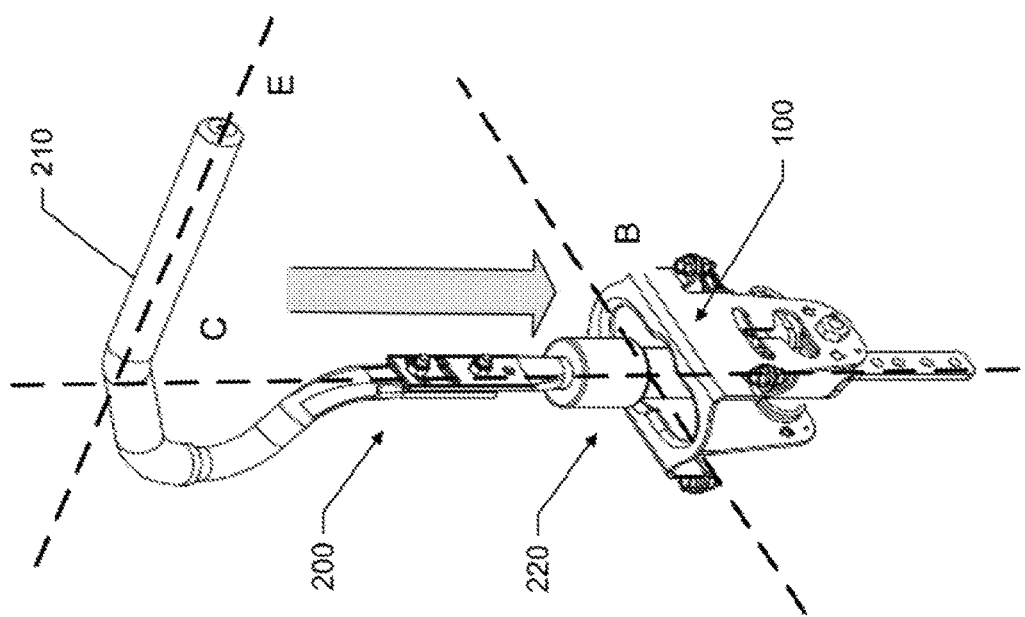

LAWN CARE VEHICLE BRAKE SYSTEM

CROSS REFERENCE TO RELATED APPLICATIONS

This application claims priority to U.S. application No. 62/577,195 filed Oct. 26, 2017, the entire contents of which are hereby incorporated by reference in its entirety.

TECHNICAL FIELD

Example embodiments generally relate to lawn care vehicles and, more particularly, to brake systems (e.g., parking brake systems) for riding lawn care vehicles.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines, and are relatively inexpensive. Meanwhile, at the other end of the spectrum, riding lawn mowers, such as lawn tractors, can be quite large. Riding lawn mowers can sometimes also be configured with various functional accessories (e.g., trailers, tillers, and/or the like) in addition to grass cutting components. Riding lawn mowers provide the convenience of a riding vehicle as well as a typically larger cutting deck as compared to a walk-behind model.

By their very nature, riding lawn mowers include steering assemblies that are used to direct the movement of the riding lawn mowers. The steering assemblies often take the familiar form of a steering wheel. However, handlebar assemblies have also been used in some cases. For example, a handlebar assembly may be used for steering a riding lawn mower when the mower has a short (e.g., near zero) turning radius. In some cases, the handlebar assembly may include separate steering levers that interface with the drive wheels on each respective side of the riding lawn mower.

BRIEF SUMMARY OF SOME EXAMPLES

Some example embodiments provided herein relate to steering levers on a riding lawn care vehicle that may be configured to not only steer and drive a riding lawn care vehicle but that may be also configured to brake the riding lawn care vehicle. Accordingly, an example embodiment may provide for a steering lever that is rotatable about a vertical axis of the steering lever to activate a brake assembly of the riding lawn care vehicle. Furthermore, rather than having the steering lever on each side of the riding lawn care vehicle activate only a corresponding brake assembly on that side, some example embodiments may provide for a brake assembly that enables only one (e.g., either one) of the steering levers to be rotated to activate the brake assembly on both wheels without requiring movement of the steering lever on the other side.

In one example embodiment, a riding lawn care vehicle is provided. The riding lawn care vehicle may include a frame to which at least a first drive wheel and a second drive wheel of the riding lawn care vehicle are attachable. The riding lawn care vehicle may further include a brake assembly operably coupled to the first and second drive wheels to enable brakes to be selectively applied to the first and second drive wheels. The riding lawn care vehicle may also include a steering assembly having a first steering lever and a second steering lever. The first and second steering levers may be operably coupled to the first and second drive wheels respectively to facilitate turning of the riding lawn care vehicle based on drive speed control of the first and second drive wheels responsive to positioning of the first and second steering levers. The first and second steering levers may also be operably coupled to the brake assembly to activate the brake assembly in response to one of the first or second steering levers being rotated about a vertical axis of the respective first or second steering lever.

In another example embodiment, a steering assembly of a riding lawn care vehicle is provided. The steering assembly may include first and second steering levers. The first and second steering levers may be operably coupled to first and second drive wheels of the riding lawn care vehicle respectively to facilitate turning of the riding lawn care vehicle based on drive speed control of the first and second drive wheels responsive to positioning of the first and second steering levers. The first and second steering levers may be operably coupled to the brake assembly to activate the brake assembly in response to one of the first or second steering levers being rotated about a vertical axis of the respective first or second steering lever.

In a further example embodiment, a brake linkage assembly of a riding lawn care vehicle is provided. The brake linkage assembly may include a disc portion. The disc portion may include a first portion configured to be operably coupled to a brake assembly of the riding lawn care vehicle. The disc portion may further include a second portion configured to be operably coupled to a first steering lever of the riding lawn care vehicle via a first cable assembly. The disc portion may even further include a third portion configured to be operably coupled to a second steering lever of the riding lawn care vehicle via a second cable assembly. In response to either of the first or second steering levers being in a braking position, the disc portion may be configured to rotate and activate the brake assembly.

BRIEF DESCRIPTION OF THE SEVERAL VIEWS OF THE DRAWING(S)

Having thus described some embodiments of the present invention in general terms, reference will now be made to the accompanying drawings, which are not necessarily drawn to scale, and wherein:

Figure 5:
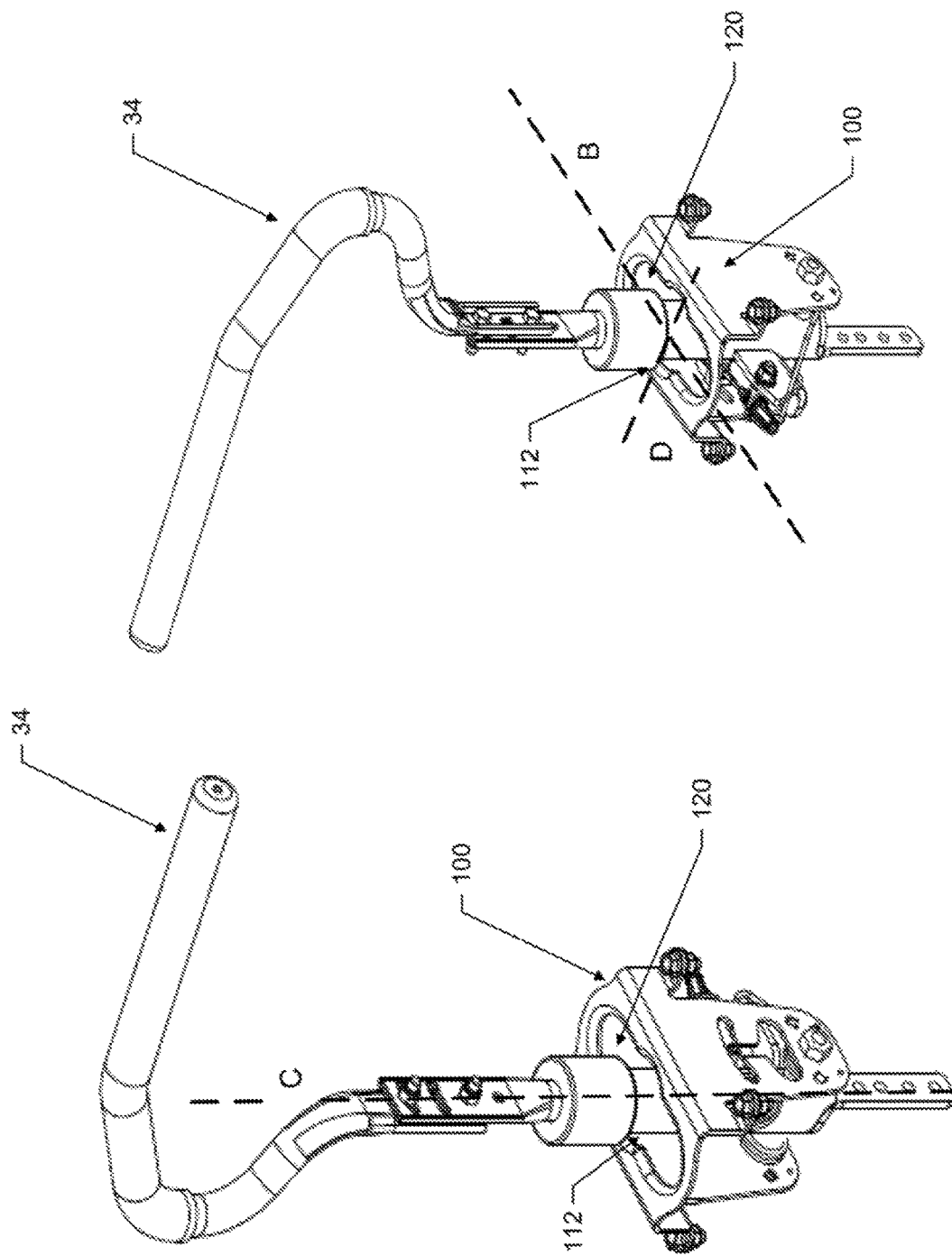
Figure 6:
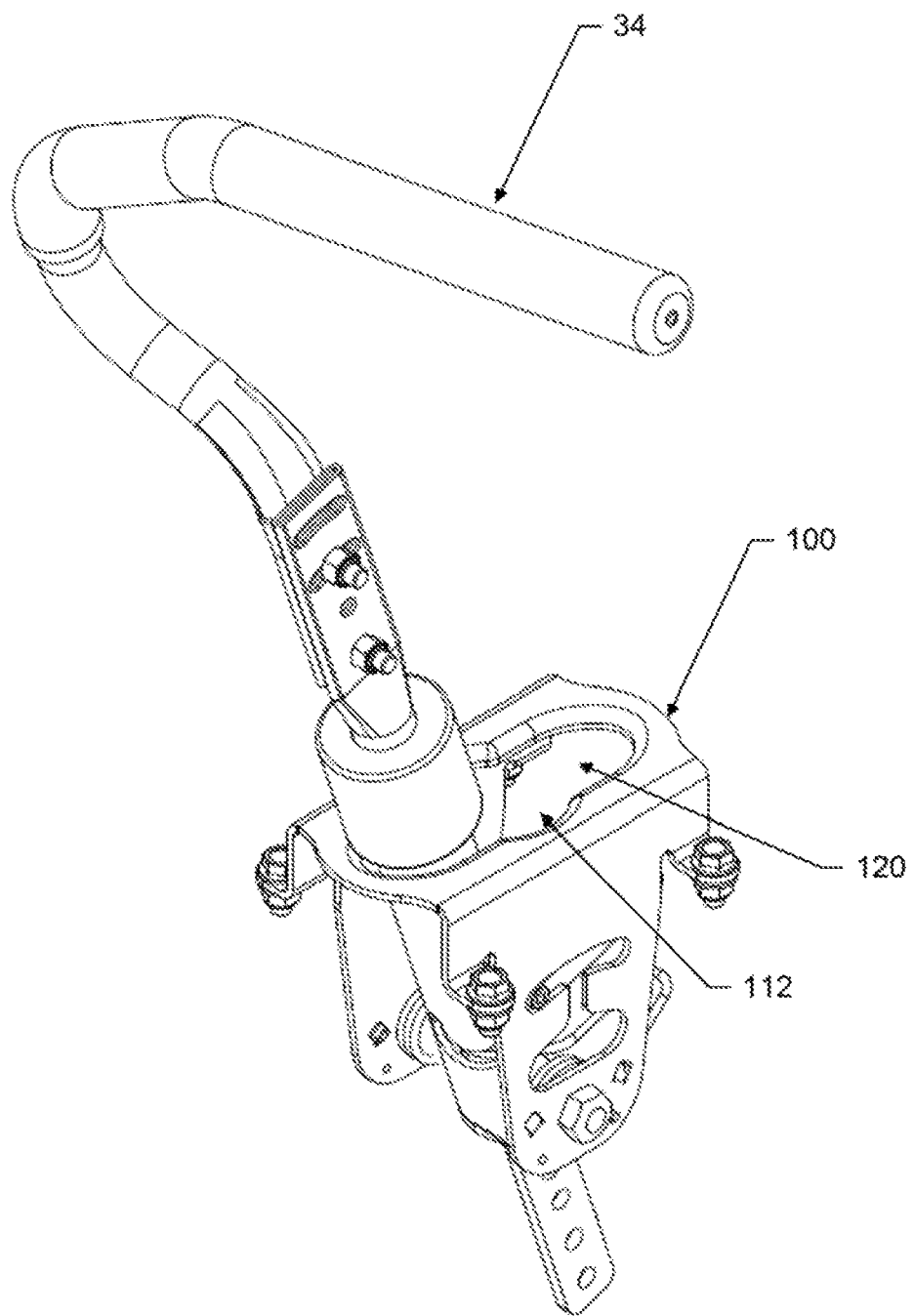
Figure 7:
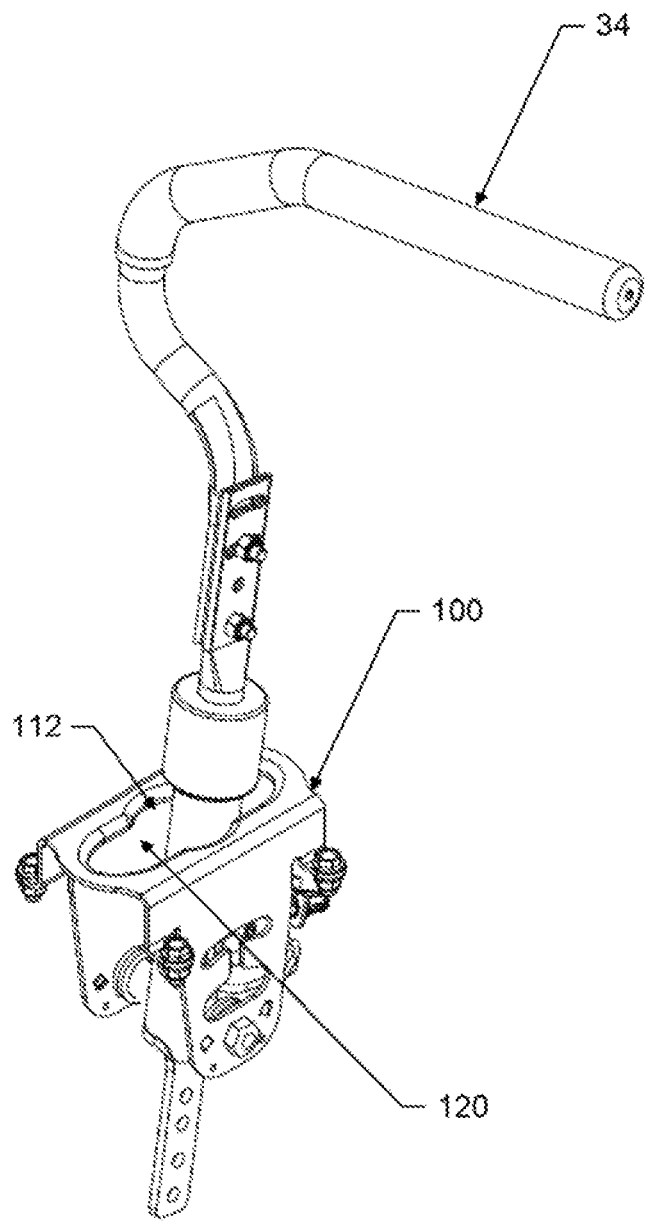
Figure 8:
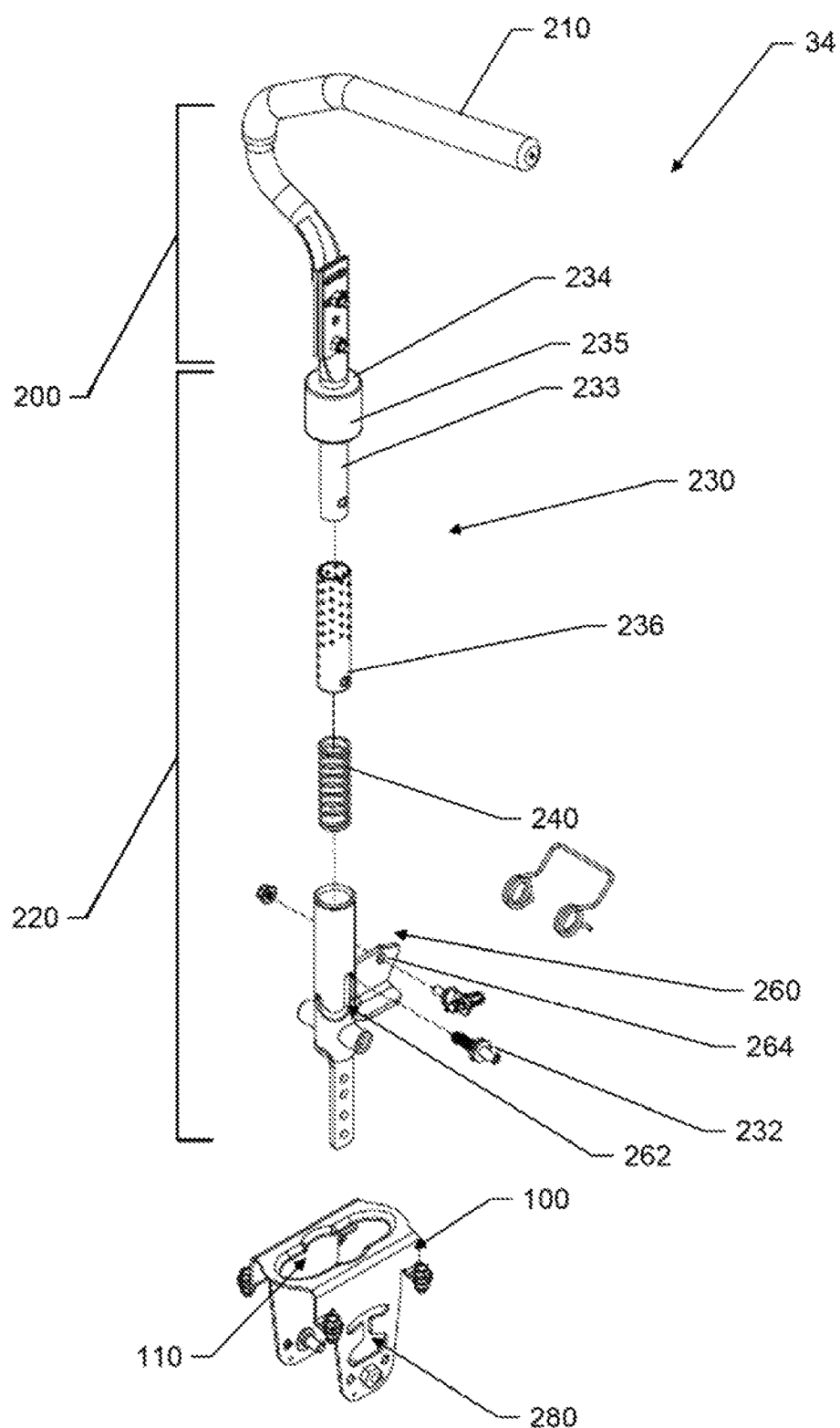
Figure 10A:
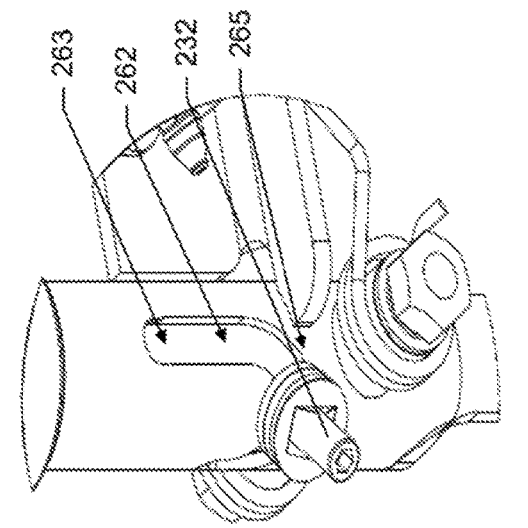
Figure 10B:
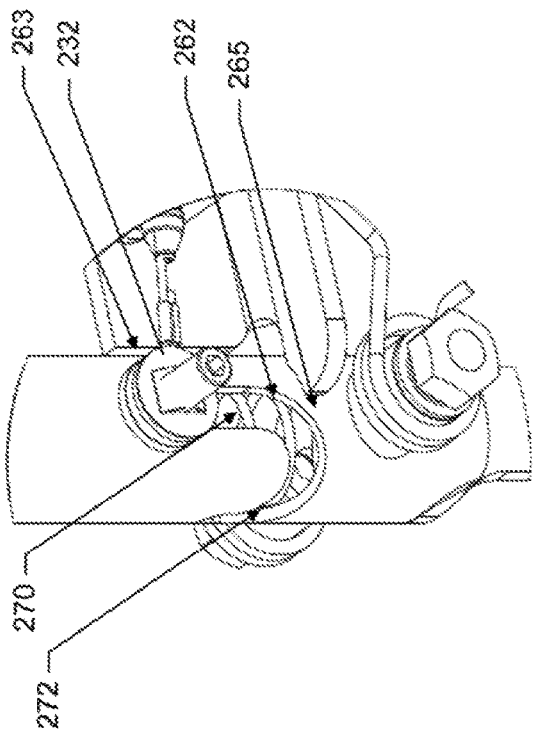
Figure 10C:
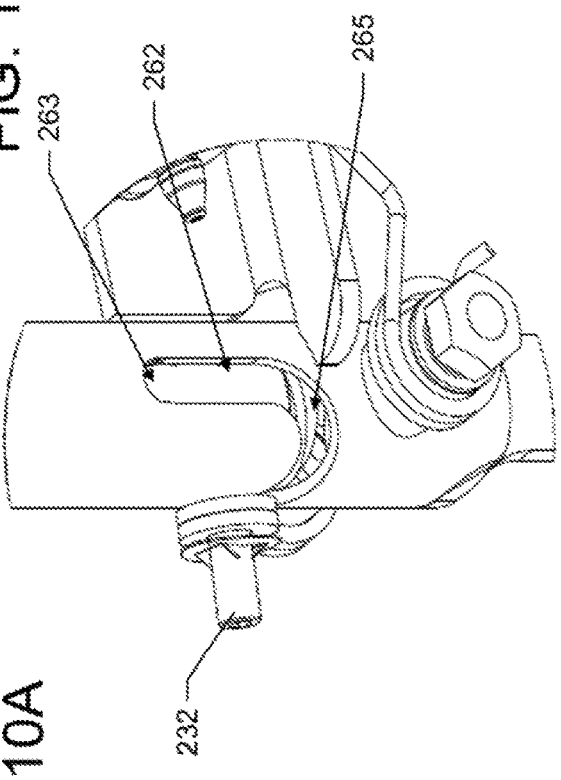
Figure 11A:
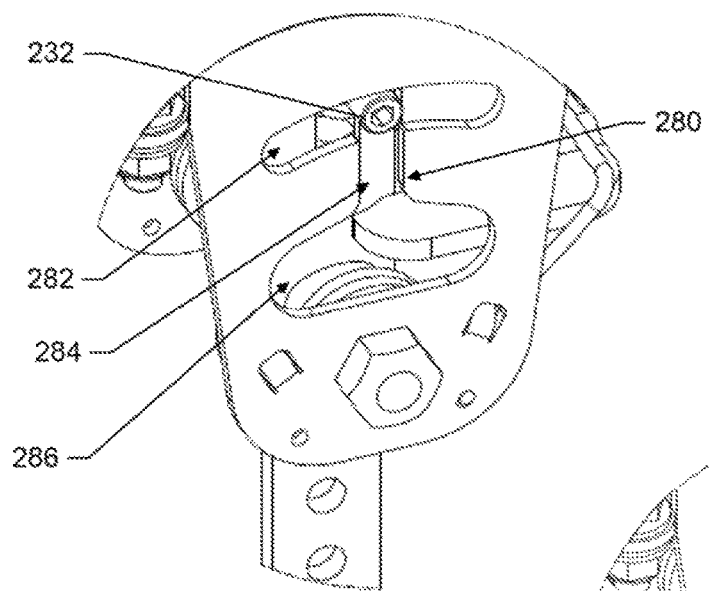
Figure 11B:
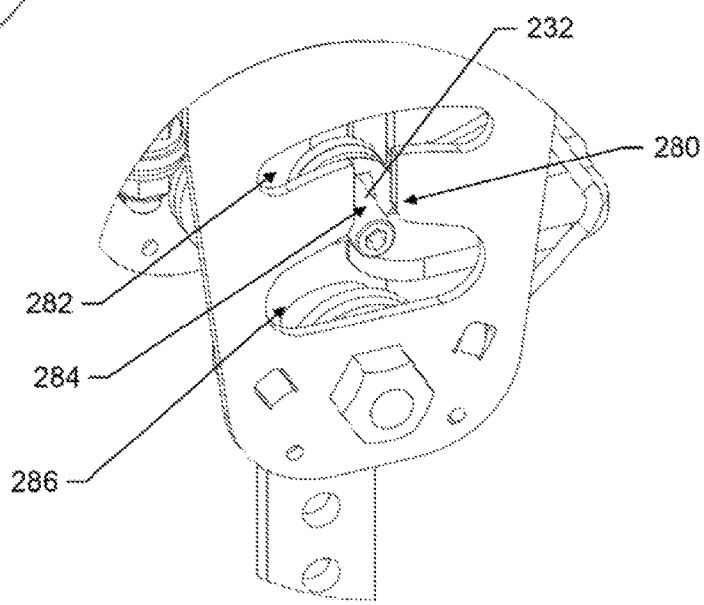
Figure 11C:
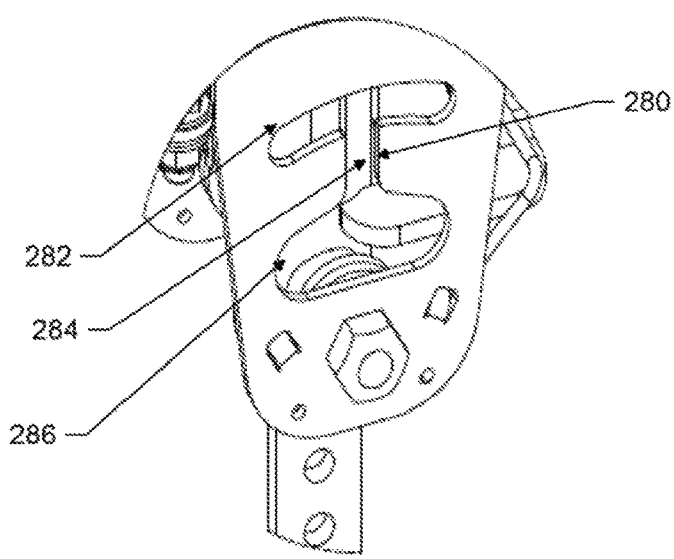
Figure 12:
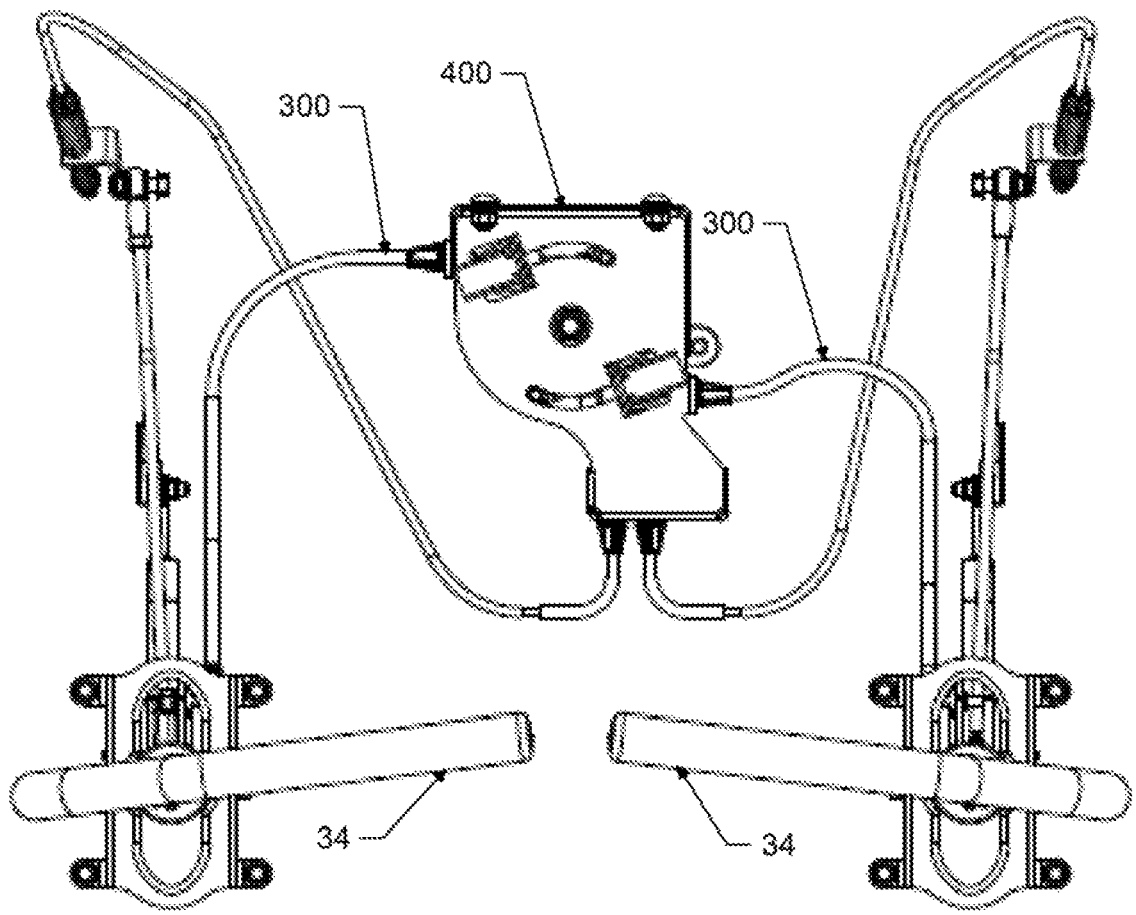
Figure 13:
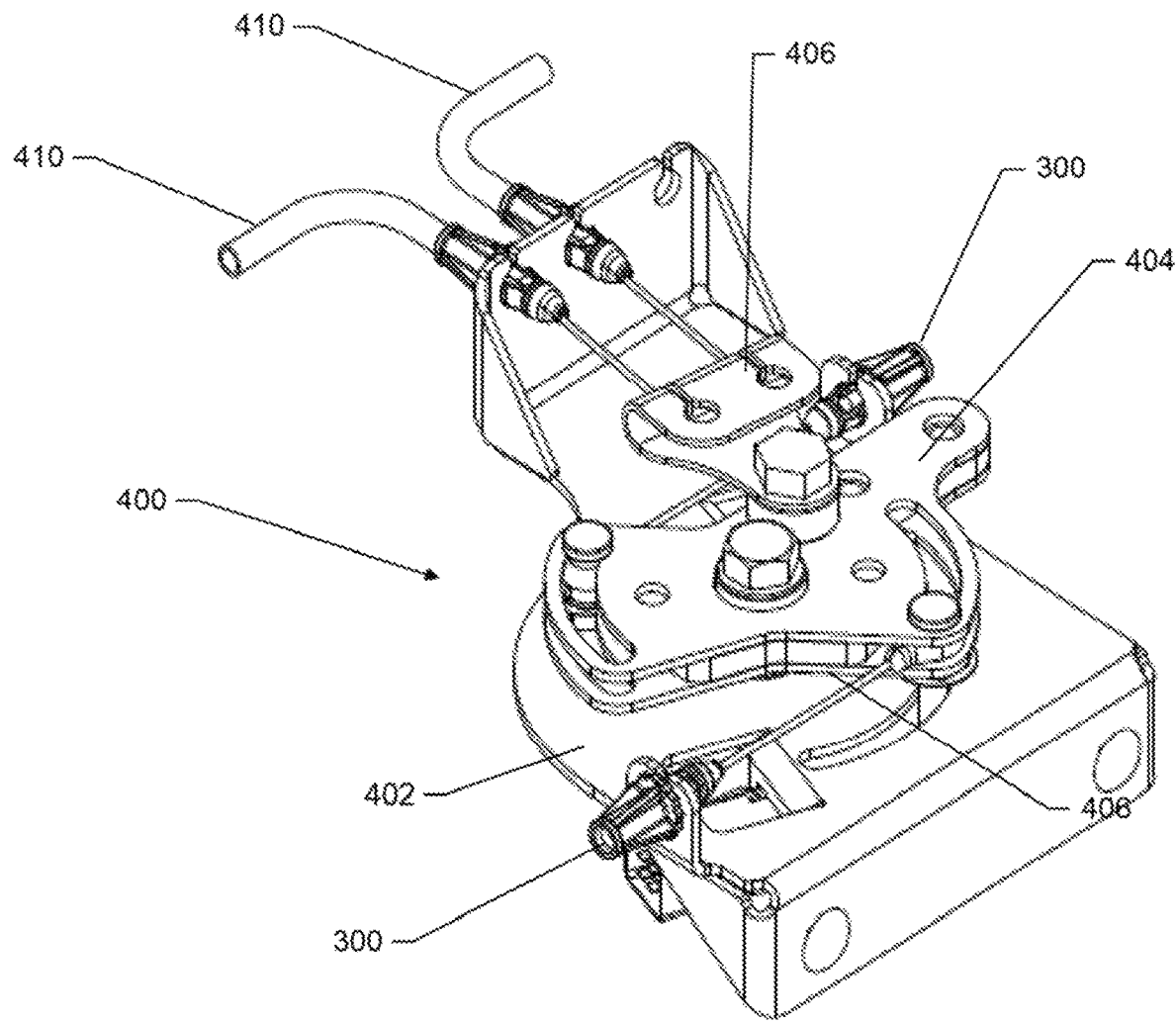

FIG. 5, which includes FIGS. 5A and 5B, illustrates a front perspective view and a rear perspective view of a steering lever of a steering assembly according to an example embodiment;

FIG. 6 illustrates a perspective view of a steering lever in a forward position according to an example embodiment;

FIG. 7 illustrates a perspective view of a steering lever in a rearward position according to an example embodiment;

FIG. 8 illustrates an exploded view of a steering lever of a steering assembly according to an example embodiment;

FIG. 9, which includes FIGS. 9A, 9B, and 9C, illustrates a perspective view of a steering lever as the steering lever moves into the braking position according to an example embodiment;

FIG. 10, which includes FIGS. 10A, 10B, and 10C, illustrates a perspective view of a cable mount portion of a steering lever as the steering lever moves into the braking position according to an example embodiment;

FIG. 11, which includes FIGS. 11A, 11B, and 11C, illustrates a perspective view of a handle height slot of a housing of a steering lever as the steering lever moves into the braking position according to an example embodiment;

FIG. 12 illustrates a top view of a steering assembly according to an example embodiment; and FIG. 13 illustrates a perspective view of a brake linkage assembly according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, the phrase "operable coupling" and variants thereof should be understood to relate to direct or indirect connection that, in either case, enables functional interconnection of components that are operably coupled to each other.

Some example embodiments may improve the ability of an operator to apply, engage, actuate, or otherwise activate brakes of lawn care vehicles such as, for example, riding lawn mowers. In this regard, some example embodiments may provide a steering assembly of a lawn care vehicle that is configured to enable not only steering and driving of the lawn care vehicle but braking of the lawn care vehicle. The brakes of the lawn care vehicle may therefore be easily applied by rotating a steering lever of the lawn care vehicle about a vertical axis of such steering lever. Furthermore, example embodiments may provide a physical link between the steering levers and the parking brake to enable the brakes to applied or activated via rotating only one of the steering levers. Thus, separate brake levers and separate operations to activate each brake to a corresponding drive wheel may therefore be avoided.

Figure 1:
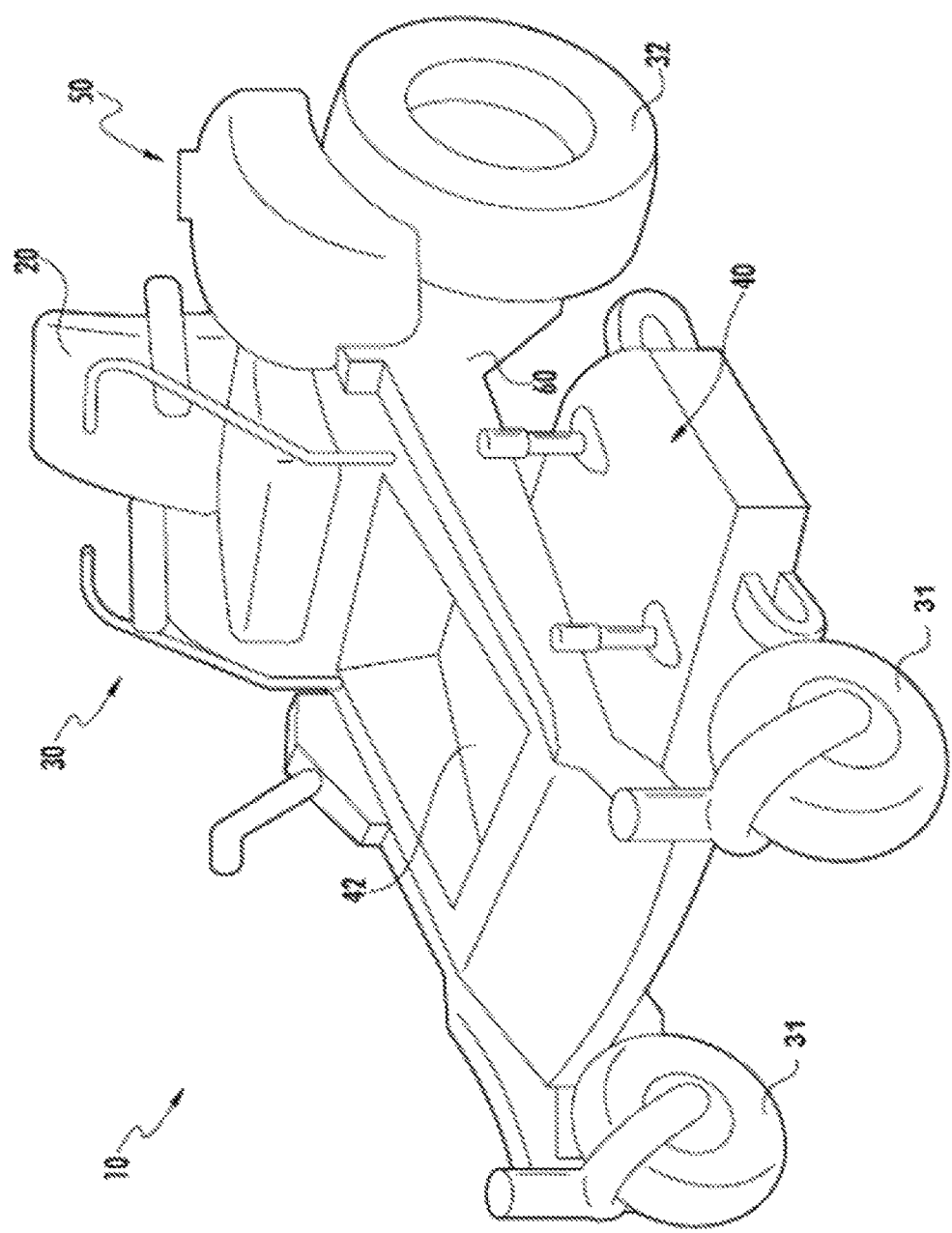
FIG. 1 illustrates a perspective view of a riding lawn care vehicle according to an example embodiment.
Figure 2:
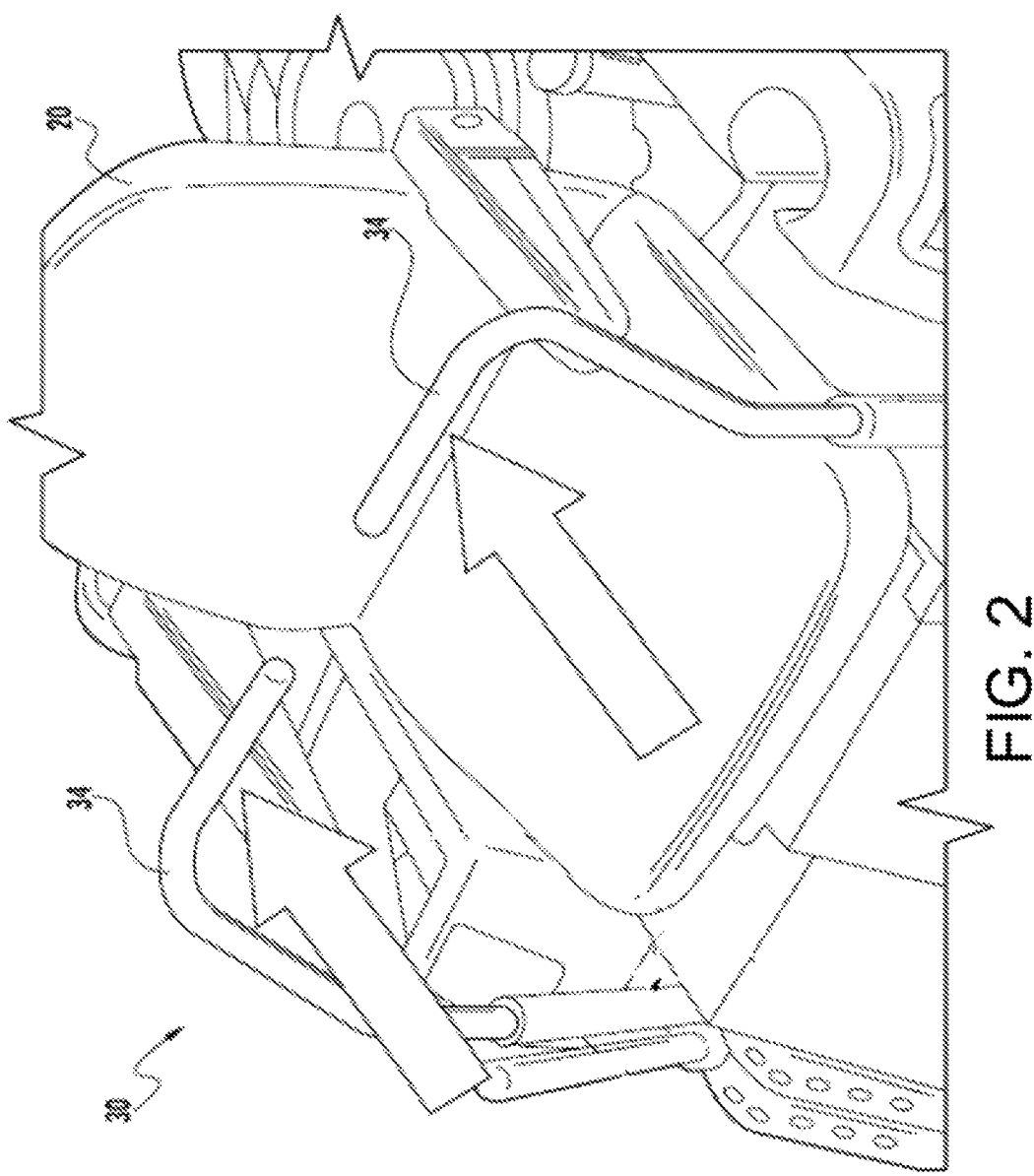
FIG. 2 illustrates a perspective view of a steering assembly with steering levers positioned to be pulled back for rearward propulsion according to an example embodiment.

FIG. 1 illustrates a riding lawn care vehicle 10 according to an example embodiment. FIG. 2 illustrates a steering assembly of the riding lawn care vehicle 10 according to an example embodiment. As shown in FIGS. 1 and 2, the riding lawn care vehicle 10 may include a seat 20 that may be disposed at a center, rear, or front portion of the riding lawn care vehicle 10. The riding lawn care vehicle 10 may also include a steering assembly 30 (e.g., a set of steering levers or the like) functionally connected to wheels 31 or 32 of the riding lawn care vehicle 10 to allow the operator to steer the riding lawn care vehicle 10. The operator may sit on the seat 20, which may be disposed to the rear of the steering assembly 30, to provide input for steering of the riding lawn care vehicle 10 via the steering assembly 30. However, some models may be stand-up models that eliminate the seat 20. If the seat 20 is eliminated, the operator may stand at an operator station proximate to the steering assembly 30.

In an example embodiment, the steering assembly 30 may include separately operable steering levers 34. The riding lawn care vehicle 10 may also include a cutting deck 40 having at least one cutting blade (e.g., three cutting blades) mounted therein. The cutting deck 40 may be positioned substantially rearward of a pair of front wheels 31 and substantially forward of a pair of rear wheels 32 in a position to enable the operator to cut grass using the cutting blade(s) when the cutting blade(s) are rotated below the cutting deck 40 when the cutting deck 40 is in a cutting position. However, in some alternative examples, the cutting deck 40 may be positioned in front of the front wheels 31. In some embodiments, a footrest 42 may also be positioned above the cutting deck 40 forward of the seat 20 to enable the operator to rest his or her feet thereon while seated in the seat 20. In embodiments that do not include the seat 20, the footrest 42 may form the operator station from which a standing operator controls the riding lawn care vehicle 10. When operating to cut grass, the grass clippings may be captured by a collection system, mulched, or expelled from the cutting deck 40 via either a side discharge or a rear discharge.

In the example embodiment, an engine 50 of the riding lawn care vehicle 10 may be disposed to the rear of a seated operator. However, in other example embodiments, the engine 50 could be in different positions such as in front of or below the operator. As shown in FIG. 1, the engine 50 may be operably coupled to one or more of the wheels 31 or 32 to provide drive power for the riding lawn care vehicle 10. The engine 50, the steering assembly 30, the cutting deck 40, the seat 20, and other components of the riding lawn care vehicle 10 may be operably connected (directly or indirectly) to a frame 60 of the riding lawn care vehicle 10. The frame 60 may be a rigid structure configured to provide support, connectivity, or interoperability functions for various ones of the components of the riding lawn care vehicle 10.

In some example embodiments, the steering assembly 30 may be embodied as an assembly of metallic or other rigid components that may be welded, bolted, or otherwise attached to each other and operably coupled to the wheels of the riding lawn care vehicle 10 to which steering inputs are provided (e.g., rear wheels 32). For example, the steering assembly 30 may include or otherwise be coupled with hydraulic motors that independently power one or more drive wheels (e.g., rear wheels 32) on each respective side of the riding lawn care vehicle 10. When a steering lever 34 is pushed forward (e.g., away from the operator in a direction opposite from the directional arrows illustrated in FIG. 2) from a neutral position, the corresponding hydraulic motor may drive the wheels disposed on a same side of the riding lawn care vehicle 10 forward. When a steering lever 34 is pulled rearward (e.g., toward the operator in a direction as shown by the directional arrows illustrated in FIG. 2) from a neutral position, the corresponding hydraulic motor may drive the wheels disposed on a same side of the riding lawn care vehicle 10 backward. Thus, when both steering levers 34 are pushed forward the same amount, the riding lawn care vehicle 10 travels forward in substantially a straight line because approximately the same amount of forward drive input is provided to each set of drive wheels (e.g., the set of wheels being a front wheel 31 and a rear wheel 32 disposed on a same side of the riding lawn care vehicle 10). When both steering levers 34 are pulled back the same amount, the riding lawn care vehicle 10 travels backward (e.g., rearward) in substantially a straight line because approximately the same amount of rearward drive input is provided to each set of drive wheels. When one steering lever 34 is pushed forward and the other steering lever 34 is pulled back, the riding lawn care vehicle 10 begins to turn in a circle or spin. Steering right and left may be accomplished by providing uneven amounts of input to the steering levers 34. Other steering control systems may be employed in some alternative embodiments.

Although the steering levers 34 are generally moved forward (i.e., opposite the direction of the arrows shown in FIG. 2) or backward (i.e., in the direction of the arrows shown in FIG. 2) in any desirable combination in order to operate the riding lawn care vehicle 10, it should be appreciated that the steering levers 34 may also be moved to an inwardly or outwardly position with respect to the frame 60 of the riding lawn care vehicle 10 to operate the riding lawn care vehicle 10 in a forward or backward direction.

Figure 3:
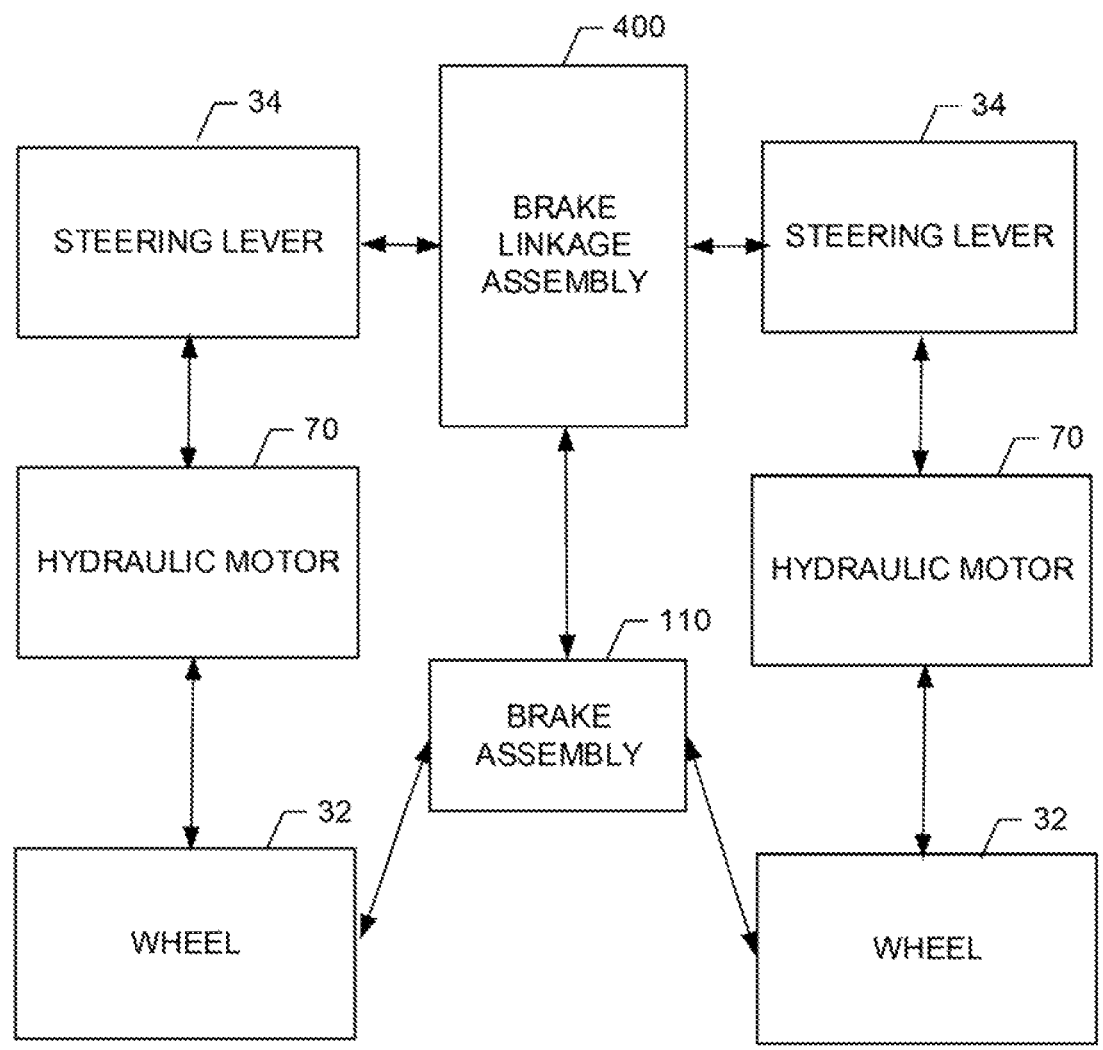
FIG. 3 illustrates a block diagram of some steering and braking components according to an example embodiment.
Figure 4:
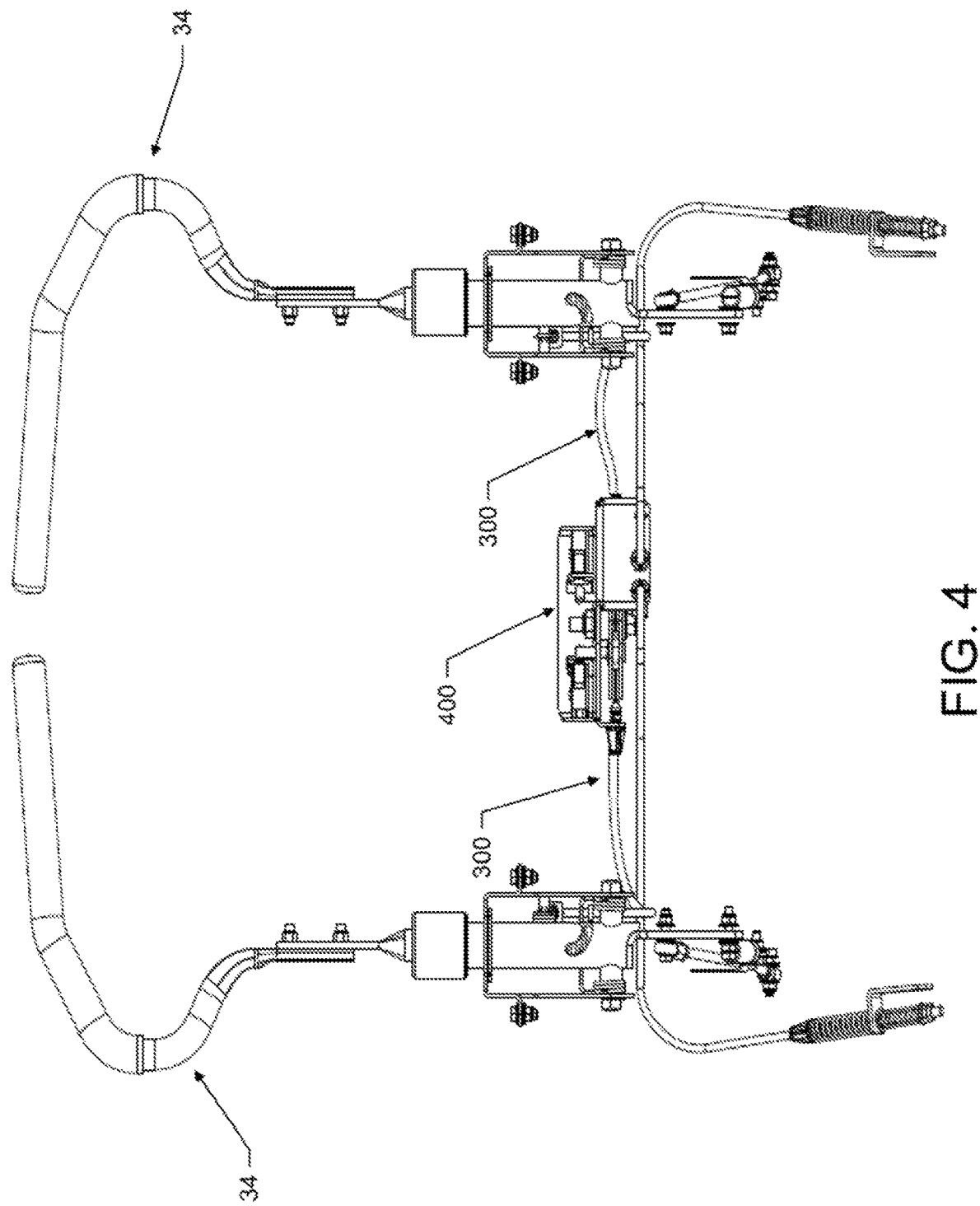
FIG. 4 illustrates a perspective view of a steering assembly according to an example embodiment.

In many conventional riding lawn care vehicles, a brake lever separate and distinct from the steering assembly is provided to interface with a brake assembly of the vehicle. In contrast to conventional riding lawn care vehicles, example embodiments herein may provide for the setting of the brake assembly 110 via one or more of the steering levers 34 of the steering assembly 30. FIGS. 3-4 illustrate example embodiments of the steering assembly 30 of the riding lawn care vehicle 10. As shown in FIGS. 3 and 4, the steering assembly 30 may include a first steering lever 34 and a second steering lever 34. Each one of the steering levers 34 may be operably coupled to a corresponding hydraulic motor 70 that powers a respective set of drive wheels 31 or 32 that are disposed on a same side of the lawn care vehicle 10 as the corresponding steering lever 34. Furthermore, in accordance with an example embodiment contained herein, the brake assembly 110 may be configured to brake both sets of wheels 31 or 32 based on moving a position of a single steering lever 34. In order to enable only one steering lever 34 to control the activation or engagement of the brake assembly 110, a brake linkage assembly 400 may be provided to operably couple both steering levers 34 to the brake assembly 110. In some cases, each of the steering levers 34 may be operably coupled to the brake linkage assembly 400 by a respective cable assembly 300. Therefore, only one of the first or second steering levers 34 may have to be rotated as described below in order to activate or engage the brake assembly 110 relative to the sets of wheels 31 and 32. In this regard, example embodiments may enable the steering assembly 30 to control not only the steering and driving of the riding lawn care vehicle 10 but also the braking. The brake assembly 110 of the riding lawn care vehicle 10 may therefore be easily applied by rotating one of the steering levers 34 as further described below. In some cases, however, both the first and second steering levers 34 may be rotated as described below in order to engage or activate the brake assembly 110.

FIGS. 5-11 illustrate more detailed views of the steering assembly 30 and steering levers 34 of the steering assembly 30 in accordance with example embodiments described herein. In this regard, FIG. 5, which includes FIGS. 5A and 5B, illustrates a perspective view of a front and a rear of the steering lever 34 in accordance with an example embodiment. FIG. 6 illustrates a perspective view of the steering lever 34 in a forward position in accordance with an example embodiment. FIG. 7 illustrates a perspective view of the steering lever 34 in a rearward position in accordance with an example embodiment. FIG. 8 illustrates an exploded view of the steering lever 34 in accordance with an example embodiment. FIG. 9, which includes FIGS. 9A, 9B, and 9C, illustrates a perspective view of the steering lever 34 as the steering lever 34 moves into a braking position in accordance with an example embodiment. FIG. 10, which includes FIGS. 10A, 10B, and 10C, illustrates a perspective view of a cable mount portion 260 of a steering lever 34 as the steering lever 34 moves into the braking position in accordance with an example embodiment. FIG. 11, which includes FIGS. 11A, 11B, and 11C, illustrates a perspective view of a handle height slot 280 of a housing 100 of the steering lever 34 as the steering lever 34 moves into the braking position in accordance with an example embodiment.

As shown in FIGS. 5-7, the steering lever 34 may be disposed in a housing 100. In some cases, the housing 100 may include a guide slot 120. In this regard, the steering lever 34 may be configured to move from a neutral position (i.e., position of the steering lever 34 illustrated in FIG. 5) to a forward direction (i.e., position of the steering lever 34 illustrated in FIG. 6) or a reverse direction (i.e., position of the steering lever 34 illustrated in FIG. 7) within the guide slot 120 of the housing 100 along a longitudinal centerline B of the guide slot 120 in order to drive or steer the riding lawn care vehicle 10. Additionally, the guide slot 120 may include a neutral slot portion 112. In some cases, the neutral slot portion 112 may be a slot that extends outwardly in a perpendicular direction (see line D in FIG. 5B) from the longitudinal centerline B of the guide slot 120 (see FIG. 5B) or from a midpoint of the guide slot 120. When the steering lever 34 is positioned in the neutral slot portion 112 as shown in FIG. 5, the steering lever 34 may be in the neutral position. From this neutral position, an operator of the riding lawn care vehicle 10 may move the steering lever 34 as described above in the forward (FIG. 6) or reverse direction (FIG. 7) to steer or drive or the riding lawn care vehicle 10. Furthermore, when the steering lever 34 is positioned in the neutral slot portion 112, the steering lever 34 may be rotated about a vertical axis C of the steering lever 34 to enable activation or engagement of the brake assembly 110. Accordingly, it should be understood that when the steering lever 34 is in the neutral position, the steering lever 34 may be manipulated to move from the neutral position along the longitudinal centerline B of the guide slot 120 to drive the riding lawn care vehicle 10 or rotated along the vertical axis C of the steering lever 34 to brake the riding lawn care vehicle 10.

In accordance with an example embodiment illustrated in FIG. 8, the steering lever 34 may include a steering portion 200 and a mounting assembly 220. The steering portion 200 may be operably coupled to the mounting assembly 220 via a nut and bolt assembly or the like. The steering portion 200 of the steering lever 34 may be a portion of the steering lever 34 that is configured to be manipulated by the operator of the riding lawn care vehicle 10 in order to steer, drive, or brake the riding lawn care vehicle 10. In other words, the steering portion 200 may include a handle 210 that is configured for use by the operator of the riding lawn care vehicle 10 in order to enable the steering, driving, or braking of the riding lawn care vehicle 10 with the steering lever 34.

The mounting assembly 220 of the steering lever 34 may be configured to operably couple the steering lever 34 to the corresponding hydraulic motor 70 that powers a respective pair of drive wheels (e.g., one of the front wheels 31 or rear wheels 32 disposed on a same side of the riding lawn care vehicle 10 as the corresponding steering lever 34). Furthermore, the mounting assembly 220 may be configured to operably couple the steering lever 34 to the brake assembly 110. In other words, as mentioned above, unlike a traditional system in which the brake assembly 110 is activated via a separate brake lever, the brake assembly 110 may be activated via manipulation of the steering portion 200 by the operator which causes a corresponding movement of at least a portion of the mounting assembly 220 of the steering lever 34.

Thus, depending on the movement of at least a portion of the mounting assembly 220, the mounting assembly 220 may operate the hydraulic motor 70 and the drive wheels 31 or 32 of the respective side of the ride lawn care vehicle 10 or engage or otherwise activate the brake assembly 110. In this regard, the movement of at least a portion of the mounting assembly 220 in the forward and reverse directions may be caused by the forward and reverse movement of the steering portion 200 of steering lever 34 (see FIGS. 6 and 7) and thus correspondingly operates the hydraulic motor 70 and drive wheels 31 or 32 of the respective side of the riding lawn care vehicle 10 in order to drive the riding lawn care vehicle 10. Furthermore, in order to activate or engage the brake assembly 110, the rotation of the steering portion 200 about the vertical axis C of the steering lever 34 may cause a corresponding rotation of at least a portion of the mounting assembly 220.

As shown in FIG. 9, in order to cause the activation of the brake assembly 110, the steering portion 200 may be rotated in a manner to cause the handle 210 to move from an operational position in which a longitudinal axis E of the handle 210 of the steering portion 210 may be substantially perpendicular to the longitudinal centerline B of the guide slot 120 (see FIG. 9A) to a position where the longitudinal axis E of the handle 210 may be substantially parallel to the longitudinal centerline B of the guide slot 120 (see FIG. 9C). In some cases, the steering portion 200 may be rotated from the operational position approximately ninety degrees to enable the activation of the brake assembly 110. The rotating of the steering portion 200 in this manner may cause a corresponding rotation of at least a portion of the mounting assembly 220 thereby causing activation or engagement of the brake assembly 110.

In some cases as shown in FIG. 9A, in order to move the steering portion 200 in the rotational motion described above to enable activation or engagement of the brake assembly 110, the steering portion 200 may be configured to be first pushed in a downward motion (e.g., a motion toward the bottom of the riding lawn care vehicle 10) along the vertical axis C of the steering lever 34 toward or into the mounting assembly 220. Once the steering portion 200 has been pushed downward a predetermined amount, the steering portion 200 (e.g., the handle 210) may then be rotated along the vertical axis C of the steering lever (see FIG. 9B). When the steering portion 200 has been rotated such that the handle 210 is substantially parallel to the longitudinal centerline B of the guide slot 120, the braking assembly 110 may be activated or engaged.

As shown in FIG. 8, the mounting assembly 220 may include a sleeve portion 230 and a cable mount portion 260. Furthermore, a biasing element 240 may be disposed between the cable mount portion 260 and the sleeve portion 230. It should be understood that the biasing element 240 may be a spring or the like. The sleeve portion 230 may be configured to lock the steering lever 34 in a position that enables or causes activation or engagement of the brake assembly 110 (i.e., a braking position). Accordingly, the rotating of the steering portion 200 in a manner as described above may cause a corresponding rotation of the sleeve portion 230 to cause engagement or activation of the brake assembly 110. The cable mount portion 260 may be configured to enable the operable coupling of the mounting assembly 220 to the brake assembly 110.

In some cases, the biasing element 240 may bias the sleeve portion 230 in a direction away from the cable mount portion 260 (i.e., in a direction toward the steering portion 200). Accordingly, when the operator desires to engage or activate the brake assembly 110, the steering portion 200 may be pushed downward along the vertical axis C of the steering lever 34 toward the sleeve portion 230 to cause a corresponding downward motion of the sleeve portion 230 toward the cable mount portion 260 to overcome the bias of the biasing element 240. Once the bias of the biasing element 240 is overcome, the steering portion 200 may rotate (as shown in FIG. 9) to lock the steering lever 34 in the braking position. When the steering lever 34 is locked in the braking position, the biasing element 240 may be held in a position in which the bias of the biasing element 240 is overcome. When the operator desires to disengage the brake assembly 110, the rotation of the steering lever 34 back into the operational position may release the tension or bias of the biasing element 240 and force the sleeve portion 230 in a direction away from the cable mount portion 260 (i.e., in a direction along the vertical axis C toward the steering portion 200) thereby enabling the operator to move the steering lever 34 in the forward or rearward direction as desired in order to operate the riding lawn care vehicle 10.

In accordance with an example embodiment, the sleeve portion 230 may include a collar portion 235, a rod portion 233, and a pin 232. In some cases, the pin 232 may be disposed on the rod portion 233 and configured to enable the locking of the steering lever 34 in the braking position to thereby cause the engagement or activation of the brake assembly 110. The sleeve portion 230 may include a first end 234 proximate the steering portion 200 and a second end 236 proximate the cable mount portion 260. In some cases, the pin 232 may be located proximate the second end 236 of the sleeve portion 230.

As mentioned above, the pin 232 may be configured to enable the locking of the steering lever 34 in the braking position. The pin 232 may also be configured to operably couple the sleeve portion 230 to the cable mount portion 260. In this regard, the cable mount portion 260 may include a slot 262 in which the pin 232 of the sleeve portion 230 may be configured to be disposed.

In some example embodiments as demonstrated in FIG. 10, the slot 262 may be J-shaped. Accordingly, the slot 262 may have a first portion 270 that extends in a vertical direction along a side of the cable mount portion 260 and a second portion 272 that extends from the first portion 270 in a curved direction toward the guide slot 120 along a portion of the circumference of the cable mount portion 260. However, it should be understood that the shape of the slot 262 may be any shape that facilitates the engagement or activation of the brake assembly 110 as discussed herein.

Accordingly, when the steering lever 34 of the riding lawn care vehicle 10 is being used to drive the riding lawn care vehicle in the forward and reverse directions, the pin 232 may be disposed proximate a first end 263 of the first portion 270 of the slot 262 (see FIG. 10A). However, when the operator desires to engage or activate the brake assembly 110, the steering portion 200 may be moved to the neutral position in the neutral slot portion 112. When the steering portion 200 is disposed in the neutral slot portion 112, the steering portion 200 may be pushed downward along the vertical axis C causing a corresponding downward motion of the sleeve portion 230 and thus the collar portion 235 and the pin 232. This downward motion of the sleeve portion 230 may cause the pin 232 to travel downward along the first portion 270 of the slot 262 toward a second end 265 of the slot 262 (see FIG. 10B). When the steering lever 34 rotates to engage or activate the brake assembly 110, the pin 232 may then travel into the second portion 272 of the slot 262 (i.e. along the curved portion of the slot 262) to lock the steering lever 34 in the braking position (see FIG. 10C). When the pin 232 is disposed in the second portion 272 of the slot 262, the steering lever 34 is effectively locked in the braking position.

As mentioned above, the cable mount portion 260 may be configured to enable the operable coupling of the mounting assembly 220 to the brake assembly 110. Accordingly, the cable mount portion 260 may include a cable mount 264 where the respective cable assembly 300 may be configured to be operably coupled. In this regard, the cable assembly 300 may be operably coupled to the brake assembly 310 at a first end and to the cable mount 264 at a second end. Furthermore, either the cable mount 264 itself or a portion of the cable assembly 300 may be operably coupled to the sleeve portion 230 such that the rotation of the sleeve portion 230 causes engagement or activation of the brake assembly 110. Accordingly, as the sleeve portion 230 rotates to cause engagement or activation of the brake assembly 110, the cable assembly 300 operably coupled to the brake assembly 110 may pulled to rotate with the sleeve portion 230 to cause the engagement or activation of the brake assembly 110. Accordingly, the movement of the pin 232 may cause a corresponding movement of the cable assembly 300.

In accordance with an example embodiment demonstrated in FIG. 11, the housing 100 may further include a handle height slot 280. The handle height slot 280 of the housing 100 may be disposed in a side of the housing 100 such that the handle height slot 280 extends in a first plane, the first plane being substantially parallel to a second plane in which the first portion 270 of the slot 262 of the blade mount portion 260 extends. In other words, the slot 262 and the handle height slot 280 may sit parallel to one another in separate planes. In some cases, the handle height slot 280 may be I-shaped. Accordingly, the handle height slot 280 may have a first portion 282, a second portion 284, and third portion 286. The first portion 282 and third portion 286 of the handle height slot 280 may extend substantially parallel to each other. Furthermore, a longitudinal axis of each of the first portion 282 and the third portion 286 may be substantially parallel to a longitudinal centerline B of the guide slot 120. The second portion 284 of the handle height slot 280 may extend perpendicularly between the first portion 282 and the third portion 286. Accordingly, a longitudinal axis of the second portion 284 of the handle height slot 280 may extend perpendicularly from the longitudinal centerline B of the guide slot 120. It should be understood, however, that the handle height slot 280 may be shaped in any manner to enable the rotation of the steering lever 34 as described herein.

The pin 232 of the sleeve portion 230 may be configured to be disposed in the first portion 282 of the handle height slot 280 when the steering lever 34 is in a forward, rearward, or neutral position. Thus, the pin 232 may travel along the first portion 282 in a manner corresponding to whether the steering lever 34 is in the neutral, forward, or rearward position (see FIG. 11A). Therefore, when the steering lever 34 of the riding lawn care vehicle 10 is being used to drive the riding lawn care vehicle in the forward and reverse directions, the first portion 282 may prevent the steering portion 200 from being pushed downward to cause engagement of the brake assembly 110. When the operator desires to engage or activate the brake assembly 110 and the steering portion 230 is pushed downward from the neutral position along the vertical axis C, the pin 232 may move from the first portion 282 to travel down the second portion 284 of the handle height slot 280 toward the third portion 286 of the handle height slot 280 (see FIG. 11B). Because the steering lever 34 rotates in order lock the steering lever 34 in the braking position, the third portion 286 may be wide enough to accommodate the pin 232 and to allow the pin 232 to transition out of the handle height slot 280 such that the steering lever 34 may be locked in a braking position in the second portion 272 of the slot 262 (see FIG. 11C). Accordingly, the third portion 286 may have an opening diameter that is wider or larger than the first portion 282. Thus, the opening diameter of the first portion 282 may be only wide enough to accommodate the sliding of the pin along the first portion 282 but not wide enough to allow the pin 232 to be transitioned out of engagement with the first portion 282.

Thus in accordance with an example embodiment, it should be understood that when the operator desires to engage or activate the brake assembly 110, the operator may move at least one of the steering levers 34 into the neutral position in the guide slot 120. When at least one of the steering levers 34 is positioned in the neutral position in the guide slot 120, the steering lever 34 may be pushed downward along with the vertical axis C of the steering lever 34 in a direction towards a bottom of the riding lawn care vehicle 10. When the steering lever 34 is being pushed downward in this manner, the pin 232 of the steering lever 34 may simultaneously travel down a length of the first portion 270 of the slot 262 and the second portion 284 of the handle height slot 280. When the pin 232 reaches an end of both the first portion 270 of the slot 262 and the second portion 284 of the handle height slot, the steering lever 34 may be configured to rotate about the vertical axis C of the steering lever 34. As the steering lever rotates about the vertical axis C, the pin 232 may be enabled to rotate out of the third portion 286 of the handle height slot 280 into the second portion 272 of the slot 262. When the pin 232 enters and travels up the second portion 272 of the slot 262 in a direction towards the guide slot 120, the braking assembly 110 may be engaged and the steering lever 34 may be effectively locked in the braking position.

As mentioned above, in order to enable only one steering lever 34 to control the activation or engagement of the brake assembly 110, a brake linkage assembly 400 may be provided to operably couple both steering levers 34 to the brake assembly 110. In some cases, each of the steering levers 34 may be operably coupled to the brake linkage assembly by the respective cable assemblies 300. Therefore, only one of the first or second steering levers 34 may have to be rotated as described above in order to activate or engage the brake assembly 110 relative to the sets of wheels 31 and 32.

FIGS. 12 and 13 illustrate more detailed views of some portions of the brake linkage assembly 400. In this regard, FIG. 12 illustrates a top view of the steering assembly 30 and brake linkage assembly 400 components in accordance with an example embodiment. FIG. 13 illustrates a perspective view of a brake linkage assembly 400 in accordance with an example embodiment. As mentioned above, the structure of the brake linkage assembly 400 may be configured to allow movement of one of the steering levers 34 to activate the brake assembly 110 relative to both sets of wheels 31 and 32 independent of the position of the other steering lever 34. Accordingly, during operation, the operator may rotate one of the steering levers 34 as mentioned above while the other steering lever may remain in the neutral position.

As shown in FIG. 13, the brake linkage assembly 400 may include a mounting plate 402 which operably couples the brake linkage assembly 400 to the riding lawn care vehicle 10. A disc portion 404 may be rotationally coupled to the mounting plate 402 to enable the engagement or activation of the brake assembly 110 in response to the rotation of one of the steering levers 34. In this regard, cable assemblies 300, which are each operably coupled to a respective steering lever 34 as described above, may be operably coupled to a surface of the disc portion 404 on respective sides of the disc portion 404. Furthermore, a first end of the braking cables 410 of the brake assembly 110 may also be operably coupled to the surface of the disc portion 404. In some cases, the disc portion 404 may include an adapter portion 406 to which the first end of braking cables 410 may be operably coupled. The adapter portion 406 may be operably to the surface of the disc portion 404 proximate a midpoint of the disc portion 404. Furthermore, the adapter portion 406 may be operably coupled proximate the midpoint at a location proximate the circumference of the disc portion 404.

When the steering lever 34 rotates as described above, the corresponding cable assembly 300 may be pulled in a direction toward the respective steering lever 34. This pulling movement on the respective cable assembly 300 may cause a corresponding rotation of the disc portion 404 to thereby also cause a pulling on the other of the cable assemblies 300. Furthermore, as the disc portion 404 rotates, both the braking cables 410 may be pulled with the disc portion 404. This pulling of the braking cables 410 with the rotation of the disc portion 404 may cause the activation of the brake assembly 110.

It should be understood that, while the brake linkage assembly 400 is discussed above in connection with embodiments where the steering levers 34 are rotated in order to enable the activation of the brake assembly 110, other example embodiments may enable the brake linkage assembly 400 to activate the brake assembly 110 in response to either of the steering levers 34 being moved to or in any braking position known in the art. For example, in some example embodiments, either of the steering levers 34 may be configured to be moved in a perpendicular direction from a longitudinal centerline of the riding lawn care vehicle 10 to an outwardly position with respect to the frame 60 of the riding lawn care vehicle 10 to enable the braking of the riding lawn care vehicle 10. Accordingly, the steering levers 34 may be configured to cause rotation of the disc portion 404 and thereby activation of the brake assembly 110 in response to either of the steering levers 34 being moved to or in any known braking position.

Accordingly, a riding lawn care vehicle is provided. The riding lawn care vehicle may include a frame to which at least a first drive wheel and a second drive wheel of the riding lawn care vehicle are attachable. The riding lawn care vehicle may further include a brake assembly operably coupled to the first and second drive wheels to enable brakes to be selectively applied to the first and second drive wheels. The riding lawn care vehicle may also include a steering assembly having a first steering lever and a second steering lever. The first and second steering levers may be operably coupled to the first and second drive wheels respectively to facilitate turning of the riding lawn care vehicle based on drive speed control of the first and second drive wheels responsive to positioning of the first and second steering levers. The first and second steering levers may also be operably coupled to the brake assembly to activate the brake assembly in response to one of the first or second steering levers being rotated about a vertical axis of the respective first or second steering lever.

In some embodiments, additional optional structures or features may be included or the structures/features described above may be modified or augmented. Each of the additional features, structures, modifications, or augmentations may be practiced in combination with the structures/features above or in combination with each other. Thus, some, all or none of the additional features, structures, modifications, or augmentations may be utilized in some embodiments. Some example additional optional features, structures, modifications, or augmentations are described below, and may include, for example, that the first and second steering levers may be disposed in a respective housing, where each housing may include a guide slot. The guide slot may include a neutral slot portion, where when the first and second steering levers are disposed in the neutral slot portion, one of the first or second steering levers may be configured to be rotated about the vertical axis of the respective first or second steering lever to activate the brake assembly. Alternatively or additionally, the neutral slot portion may extend outwardly in a perpendicular direction from a longitudinal centerline of the guide slot. Alternatively or additionally, the first and second steering levers may each include a steering portion and a mounting assembly, where the steering portion may include a handle to enable an operator of the riding lawn care vehicle to manipulate the respective first or second steering lever, and the brake assembly may be configured to be activated by rotating one of the first or second steering levers about the vertical axis of the respective first or second steering lever such that a longitudinal axis of the handle of the steering portion is parallel to a longitudinal centerline of the guide slot. Alternatively or additionally, the first and second steering levers may each include a steering portion and a mounting assembly, where the first and second steering levers may be operably coupled to the brake assembly via the mounting assembly. Alternatively or additionally, the mounting assembly may include a sleeve portion and a cable mount portion, where in response to pushing the steering portion in a direction towards the mounting assembly along the vertical axis of the respective first or second steering lever, the steering portion may be configured to be rotated about the vertical axis of the respective first or second steering lever. The sleeve portion may also be configured to correspondingly rotate about the vertical axis to lock the respective first or second steering lever in a braked position. Alternatively or additionally, the sleeve portion may include a pin, where the cable mount portion may include a slot and the pin may be disposed in the slot to operably couple the sleeve portion to the cable mount portion. Alternatively or additionally, the slot may be J-shaped having a first portion that extends in a vertical direction along a side of the cable mount portion and a second portion that extends from the first portion in a curved direction along a portion of a circumference of the cable mount portion. In some cases, in response to the pushing of the steering portion towards the cable mount portion along the vertical axis of the respective first or second steering lever, the pin may be configured to travel down the first portion of the slot toward the second portion of the slot, and in response to the rotating of the sleeve portion, the pin may be configured to move into the second portion of the slot to lock the respective first or second steering lever in the braked position. Alternatively or additionally, one of the first or second steering levers may be configured to rotate about the vertical axis of the respective first or second steering lever approximately ninety degrees to activate the brake assembly. Alternatively or additionally, a first cable may operably couple the first steering lever to the brake assembly, and a second cable may operably couple the second steering lever to the brake assembly. Alternatively or additionally, the riding lawn care vehicle may further include a brake linkage assembly, and the brake linkage assembly may be configured to enable one of the first or second steering levers to be rotated about the vertical axis of the steering lever to activate the brake assembly while the other of the first or second steering levers remains in an operational position. Alternatively or additionally, the brake linkage assembly may include a disc portion, and the disc portion may be operably coupled to the brake assembly at a first portion. In some cases, a first cable may be operably coupled to the first steering lever at a first end of the first cable and to a second portion of the disc portion at a second end of the first cable. Furthermore, a second cable may be operably coupled to the second steering lever at a first end of the second cable and to a third portion of the disc portion at a second end of the second cable. In response to either of the first or second levers being rotated, the disc portion may be configured to correspondingly rotate and activate the brake assembly. Alternatively or additionally, the riding lawn care vehicle may be a zero turn mower.

Furthermore, a brake linkage assembly of a riding lawn care vehicle is provided. The brake linkage assembly may include a disc portion. The disc portion may include a first portion configured to be operably coupled to a brake assembly of the riding lawn care vehicle. The disc portion may further include a second portion configured to be operably coupled to a first steering lever of the riding lawn care vehicle via a first cable assembly. The disc portion may even further include a third portion configured to be operably coupled to a second steering lever of the riding lawn care vehicle via a second cable assembly. In response to either of the first or second steering levers being in a braking position, the disc portion may be configured to rotate and activate the brake assembly.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits, or solutions to problems are described herein, it should be appreciated that such advantages, benefits, and/or solutions may be applicable to some example embodiments, but not necessarily all example embodiments. Thus, any advantages, benefits, or solutions described herein should not be thought of as being critical, required, or essential to all embodiments or to that which is claimed herein. Although specific terms are employed herein, they are used in a generic and descriptive sense only and not for purposes of limitation.

That which is claimed:

1. A riding lawn care vehicle comprising:
   a frame to which at least a first drive wheel and a second drive wheel of the riding lawn care vehicle are attachable;
   a brake assembly operably coupled to the first and second drive wheels to enable brakes to be selectively applied to the first and second drive wheels; and
   a steering assembly comprising a first steering lever and a second steering lever, wherein the first and second steering levers are operably coupled to the first and second drive wheels respectively to facilitate turning of the riding lawn care vehicle based on drive speed control of the first and second drive wheels responsive to positioning of the first and second steering levers, and
   wherein the first and second steering levers are operably coupled to the brake assembly to activate the brake assembly in response to one of the first or second steering levers being rotated about a vertical axis of the respective first or second steering lever.

2. The riding lawn care vehicle of claim 1, wherein the first and second steering levers are disposed in a respective housing, wherein each housing comprises a guide slot, the guide slot comprising a neutral slot portion, wherein when the first and second steering levers are disposed in the neutral slot portion, one of the first or second steering levers is configured to be rotated about the vertical axis of the respective first or second steering lever to activate the brake assembly.

3. The riding lawn care vehicle of claim 2, wherein the neutral slot portion extends outwardly in a perpendicular direction from a longitudinal centerline of the guide slot.

4. The riding lawn care vehicle of claim 2, wherein the first and second steering levers each comprise a steering portion and a mounting assembly, wherein the steering portion comprises a handle to enable an operator of the riding lawn care vehicle to manipulate the respective first or second steering lever, wherein the brake assembly is configured to be activated by rotating one of the first or second steering levers about the vertical axis of the respective first or second steering lever such that a longitudinal axis of the handle of the steering portion is parallel to a longitudinal centerline of the guide slot.

5. The riding lawn care vehicle of claim 1, wherein the first and second steering levers each comprise a steering portion and a mounting assembly, wherein the first and second steering levers are operably coupled to the brake assembly via the mounting assembly.

6. The riding lawn care vehicle of claim 5, wherein the mounting assembly comprises a sleeve portion and a cable mount portion, wherein in response to pushing the steering portion in a direction towards the mounting assembly along the vertical axis of the respective first or second steering lever, the steering portion is configured to be rotated about the vertical axis of the respective first or second steering lever, and wherein the sleeve portion is configured to correspondingly rotate about the vertical axis to lock the respective first or second steering lever in a braked position.

7. The riding lawn care vehicle of claim 6, wherein the sleeve portion comprises a pin, wherein the cable mount portion comprises a slot, and wherein the pin is disposed in the slot to operably couple the sleeve portion to the cable mount portion.

8. The riding lawn care vehicle of claim 7, wherein the slot is J-shaped having a first portion that extends in a vertical direction along a side of the cable mount portion and a second portion that extends from the first portion in a curved direction along a portion of a circumference of the cable mount portion, wherein in response to the pushing of the steering portion towards the cable mount portion along the vertical axis of the respective first or second steering lever, the pin is configured to travel down the first portion of the slot toward the second portion of the slot, and wherein in response to the rotating of the sleeve portion, the pin is configured to move into the second portion of the slot to lock the respective first or second steering lever in the braked position.

9. The riding lawn care vehicle of claim 1, wherein one of the first or second steering levers is configured to rotate about the vertical axis of the respective first or second steering lever approximately ninety degrees to activate the brake assembly.

10. The riding lawn care vehicle of claim 1, wherein a first cable assembly operably couples the first steering lever to the brake assembly, and wherein a second cable assembly operably couples the second steering lever to the brake assembly.

11. The riding lawn care vehicle of claim 1, wherein the riding lawn care vehicle further comprises a brake linkage assembly, the brake linkage assembly being configured to enable one of the first or second steering levers to be rotated about the vertical axis of the steering lever to activate the brake assembly (110) while the other of the first or second steering levers remains in an operational position.

12. The riding lawn care vehicle of claim 11, wherein the brake linkage assembly comprises a disc portion, wherein the disc portion is operably coupled to the brake assembly at a first portion, wherein a first cable assembly is operably coupled to the first steering lever at a first end of the first cable assembly and to a second portion of the disc portion at a second end of the first cable assembly, wherein a second cable assembly is operably coupled to the second steering lever at a first end of the second cable assembly and to a third portion of the disc portion at a second end of the second cable assembly, wherein in response to either of the first or second levers being rotated, the disc portion is configured to correspondingly rotate and activate the brake assembly.

13. The riding lawn care vehicle of claim 1, wherein the riding lawn care vehicle is a zero turn mower.

14. A steering assembly of a riding lawn care vehicle, the steering assembly comprising:
a first steering lever; and
a second steering lever,
wherein the first and second steering levers are configured to be operably coupled to a first drive wheel and a second drive wheel respectively of the riding lawn care vehicle to facilitate turning of the riding lawn care vehicle based on drive speed control of the first and second drive wheels responsive to positioning of the first and second steering levers, and
wherein the first and second steering levers are configured to be operably coupled to a brake assembly of the riding lawn care vehicle to activate the brake assembly in response to one of the first or second steering levers being rotated about a vertical axis of the respective first or second steering lever.

15. The steering assembly of claim 14, wherein the first and second steering levers are configured to be disposed in a respective housing, wherein each housing comprises a guide slot, the guide slot comprising a neutral slot portion, wherein when the first and second steering levers are disposed in the neutral slot portion, one of the first or second steering levers is configured to be rotated about the vertical axis of the respective first or second steering lever to activate the brake assembly.

16. The steering assembly of claim 15, wherein the neutral slot portion extends outwardly in a perpendicular direction from a longitudinal centerline of the guide slot, or
wherein the first and second steering levers each comprise a steering portion and a mounting assembly, wherein the steering portion comprises a handle to enable an operator of the riding lawn care vehicle to manipulate the respective first or second steering lever, wherein the brake assembly of the riding lawn care vehicle is configured to be activated by rotating one of the first or second steering levers about the vertical axis of the respective first or second steering lever such that a longitudinal axis of the handle of the steering portion is parallel to a longitudinal centerline of the guide slot.

17. The steering assembly of claim 14, wherein the first and second steering levers each comprise a steering portion and a mounting assembly, wherein the first and second steering levers are configured to be operably coupled to the brake assembly via the mounting assembly, and
wherein the mounting assembly comprises a sleeve portion and a cable mount portion, wherein in response to pushing the steering portion in a direction towards the mounting assembly along the vertical axis of the respective first or second steering lever, the steering portion is configured to be rotated about the vertical axis of the respective first or second steering lever, and wherein the sleeve portion is configured to correspondingly rotate about the vertical axis to lock the respective first or second steering lever in a braked position.

18. The steering assembly of claim 17, wherein the sleeve portion comprises a pin, wherein the cable mount portion comprises a slot, and wherein the pin is configured to be disposed in the slot to operably couple the sleeve portion to the cable mount portion, and
wherein the slot is J-shaped having a first portion that extends in a vertical direction along a side of the cable mount portion and a second portion that extends from the first portion in a curved direction along a portion of a circumference of the cable mount portion, wherein in response to the pushing of the steering portion towards the cable mount portion along the vertical axis of the respective first or second steering lever, the pin is configured to travel down the first portion of the slot toward the second portion of the slot, and wherein in response to the rotating of the sleeve portion, the pin is configured to move into the second portion of the slot to lock the respective first or second steering lever in the braked position.

19. The steering assembly of claim 14, wherein one of the first or second steering levers is configured to rotate about the vertical axis of the respective first or second steering lever approximately ninety degrees to activate the brake assembly,
wherein a first cable assembly is configured to operably couple the first steering lever to the brake assembly, and wherein a second cable assembly is configured to operably couple the second steering lever to the brake assembly,
wherein the steering assembly further comprises a brake linkage assembly, the brake linkage assembly being configured to enable one of the first or second steering levers to be rotated about the vertical axis of the steering lever to activate the brake assembly while the other of the first or second steering levers remains in an operational position, or wherein the brake linkage assembly comprises a disc portion, wherein the disc portion is configured to be operably coupled to the brake assembly at a first portion, wherein a first cable assembly is configured to be operably coupled to the first steering lever at a first end of the first cable assembly and to a second portion of the disc portion at a second end of the first cable assembly, wherein a second cable assembly is configured to be operably coupled to the second steering lever at a first end of the second cable assembly and to a third portion of the disc portion at a second end of the second cable assembly, wherein in response to either of the first or second levers being rotated, the disc portion is configured to correspondingly rotate and activate the brake assembly.

\* \* \* \* \*